United States Patent [19]

Kruschke

[11] Patent Number: 4,848,041
[45] Date of Patent: Jul. 18, 1989

[54] ABRASIVE GRAINS IN THE SHAPE OF PLATELETS

[75] Inventor: Howard L. Kruschke, Roberts, Wis.

[73] Assignee: Minnesota Mining and Manufacturing Company, St. Paul, Minn.

[21] Appl. No.: 124,497

[22] Filed: Nov. 23, 1987

[51] Int. Cl.$^4$ ............................................... B24D 3/02
[52] U.S. Cl. .......................................... 51/309; 51/295
[58] Field of Search ................................. 51/295, 309

[56] References Cited

U.S. PATENT DOCUMENTS

| | | | |
|---|---|---|---|
| 3,079,243 | 2/1963 | Ueltz | 51/298 |
| 3,377,660 | 4/1968 | Marshall et al. | 18/26 |
| 3,491,492 | 1/1970 | Ueltz | 51/309 |
| 3,637,360 | 1/1972 | Ueltz et al. | 51/309 |
| 3,909,991 | 10/1975 | Coes, Jr. | 51/309 |
| 4,073,096 | 2/1978 | Ueltz et al. | 51/309 |
| 4,194,887 | 3/1980 | Ueltz et al. | 51/309 |
| 4,252,544 | 2/1981 | Takahashi | 51/309 |
| 4,314,827 | 2/1982 | Leitheiser et al. | 51/309 |

Primary Examiner—A. Lionel Clingman
Assistant Examiner—Willie J. Thompson
Attorney, Agent, or Firm—Donald M. Sell; Walter N. Kirn; David L. Weinstein

[57] ABSTRACT

Abrasive grains having a shape such that the mean particle volume ratio thereof is less than about 0.8, and preferably ranges from about 0.3 to about 0.7. Typically, the grains have the shape of a thin platelet, the average thickness of which must be no greater than about 460 micrometers. The abrasive grains of this invention can be used in coated abrasive products, bonded abrasive products, nonwoven abrasive products, and abrasive brushes. The products made with the grains of this invention exhibit higher initial cut and higher total cut, along with lower grinding forces than do products having equivalent weight loadings of conventional abrasive grains.

10 Claims, 3 Drawing Sheets

ABRASIVE GRAINS IN THE SHAPE OF PLATELETS

BACKGROUND OF THE INVENTION

1. Field of the Invention

This invention relates to abrasive grains, and, more particularly, abrasive grains having a particular shape and size.

2. Discussion of the Prior Art

Three basic technologies that can be employed in the production of shaped abrasive materials suitable for use as abrasive grains are fusion, sintering, and chemical ceramic.

In general, abrasive grains prepared by means of a fusion process can be shaped by a chill roll with or without an engraved roll face, a mold into which molten material is poured, or a heat sink material immersed into an aluminum oxide melt. U.S. Pat. No. 3,377,660 discloses an apparatus utilizing a trough for flowing molten abrasive material from a furnace onto a cool rotating casting cylinder, rapidly solidifying it into a thin semi-solid curved sheet, densifying the semi-solid material by reversing its curvature by pulling it away from the cylinder with a driven rapidly cooled conveyor means whereupon the partially fractured strip is deposited onto collecting means in the form of large fragments which upon being rapidly cooled and solidified break up into smaller fragments well adapted to be reduced in size to form conventional abrasive particles. U.S. Pat. Nos. 4,073,096 and 4,194,887 disclose a process for the manufacture of abrasive material in which (1) an abrasive mix is brought to fusion as in an electric arc furnace, (2) a relatively cold substrate is dipped into the molten material whereby a layer of solid abrasive material is quickly frozen (or plated) on the substrate, (3) the plated substrate is withdrawn from the molten material, and (4) the solidified abrasive material is broken away from the substrate and collected for further processing to produce abrasive grains.

Abrasive minerals prepared by a sintering process can be formed from refractory powders having a particle size of 1 to 10 micrometers in diameter. Binders can be added to the powders along with a lubricant and a suitable solvent, e.g., water. The resulting mixtures, pastes, or slurries can be shaped into platelets or rods of various lengths and diameters. In firing the resulting shaped grains to density, high temperatures, e.g. 1400° to 180° C., high pressures, and long soak times, up to 10 hours, must be used. Crystal size may range from under one micrometer up to 25 micrometers. To obtain shorter residence times and/or smaller crystal size, either the pressure or temperature must be increased. U.S. Pat. No. 3,079,242 discloses a method of making abrasive grain from calcined bauxite material comprising reducing the material to a fine powder, compacting under affirmative pressure and forming the fine particles of said powder into grain sized agglomerations, and sintering said agglomerations of particles at a temperature below the fusion temperature of the bauxite to induce limited recrystallization of said particles, whereby to produce abrasive grains directly to size. U.S. Pat. No. 4,252,544 discloses alumina abrasive grains wherein the grain structure is constructed of electrofused or high temperature calcined alumina coarse crystal particles and alumina fine crystal particles which are located between said alumina coarse crystal particles, the latter having particle sizes smaller than that of the former and being processed at a calcination temperature lower than that of the former, wherein said fine crystal particles are sintered integrally with said coarse crystal particles. U.S. Pat. No. 3,491,492 discloses a process for making an aluminous abrasive grain formed from bauxite, or mixtures of bauxite and Bayer process alumina wherein the comminuted aluminous material is mixed with water and ferric ammonium citrate, or with ferric ammonium citrate and citric acid and reduced to a state of fine subdivision by milling to give a fluid slurry of high solid content, drying said slurry to coherent cakes having a thickness equal to one dimension of the final grain before sintering, breaking said cakes to grains, screening, optionally rounding said grains by air mulling, screening, sintering, cooling, and screening to yield the final product. U.S. Pat. No. 3,637,630 discloses a process in which the same aluminous slurry disclosed in U.S. Pat. No. 3,491,492 is plated or coated on a rotating anode of an electrolytic cell. The wet, high density platelets of aluminous material are removed from the rotating anode via air impingement, dried, crushed, sized and sintered to density.

Chemical ceramic technology involves converting a colloidal dispersion or hydrosol (sometimes called a sol) in a mixture with solutions or other sol precursors to a gel or any other physical state which restrains the mobility of the components, drying, and firing to obtain a ceramic material. A sol can be prepared by precipitation of a metal hydroxide from an aqueous solution followed by peptization, dialysis of anions from a solution of metal salt, solvent extraction of an anion from a solution of a metal salt, hydrothermal decomposition of a solution of a metal salt having a volatile anion, etc. The sol contains metal oxide or precursor thereof and is transformed to a semi-rigid solid state of limited mobility such as a gel by e.g., partial extraction of the solvent. Chemical ceramic technology has been employed to produce ceramic materials such as fibers, films, flakes, and microspheres. U.S. Pat. No. 4,314,827 discloses synthetic, non-fused aluminum oxide-based abrasive mineral having a microcrystalline structure of randomly oriented crystallites comprising a dominant continuous phase of alpha-alumina and a secondary phase.

Although the foregoing references, and others, allude to shaped abrasive grains, none have indicated that any particular shape or size would provide enhanced properties with respect to abrading.

SUMMARY OF THE INVENTION

This invention provides abrasive products comprising abrasive grains having shapes wherein the mean particle volume ratio is less than about 0.8, and preferably ranges from about 0.3 to about 0.7. Generally, the grains have a shape that can be characterized as a thin platelet. It has been found that the grains must have an average thickness no greater than about 460 micrometers.

The abrasive products of this invention exhibit higher initial cut and higher total cut, along with lower grinding forces than do abrasive products having equivalent weight loadings of conventional abrasive grains.

Although abrasive products utilizing the abrasive grains of this invention have the same abrasive grain weight as products made with conventional abrasive grain, the increased number of cutting points due to the increased number of abrasive particles present results in a more effective and a higher performing abrasive article.

The abrasive grains of this invention can be used in coated abrasive products, bonded abrasive products, nonwoven abrasive products, and abrasive brushes. At least 15% by weight, and preferably 50 to 100% by weight, of the grains of the abrasive product should be of the type described herein.

DETAILED DESCRIPTION

Figure 1:
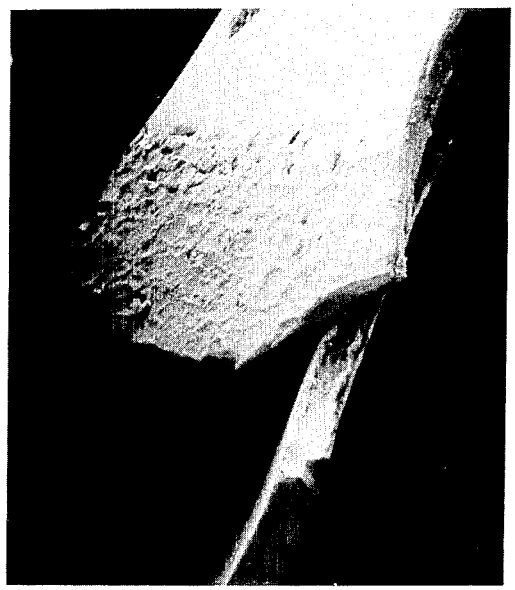
FIG. 1 is a picture of abrasive grains of this invention, photographed at 32X using a scanning electron microscope, said grains being made of ceramic aluminum oxide.
Figure 2:
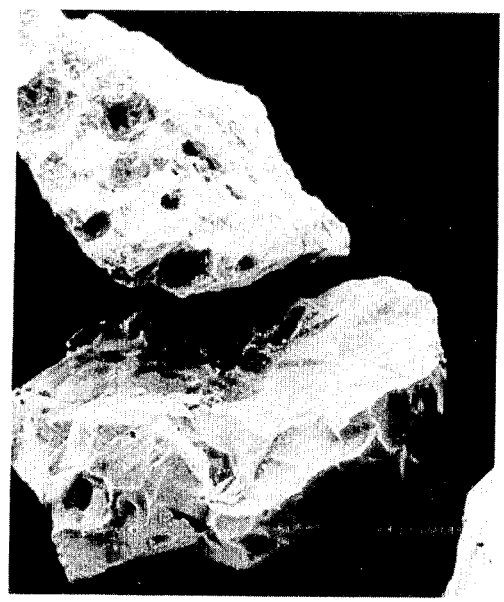
FIG. 2 is a picture of conventional brown aluminum oxide mineral, photographed at 32X using a scanning electron microscope.
Figure 3:
FIG. 3 is a picture of conventional ceramic aluminum oxide mineral (Cubitron ®, available from Minnesota Mining and Manufacturing Company), photographed at 32X using a scanning electron microscope.

FIG. 1 shows abrasive grains of the present invention. The abrasive grains of this invention can be formed from materials known to be useful for forming abrasive grains. These materials include natural or synthetic materials such as, for example, flint, garnet, aluminum oxide, alumina: zirconia, diamond, and silicon carbide, and ceramic minerals such as modified aluminum oxide (e.g. Cubitron ®). The two critical factors of the abrasive grains of this invention are mean particle volume ratio and particle thickness.

Mean particle volume ratio of the grains must be less than 0.80, and preferably ranges from 0.30 to 0.80, more preferably from 0.30 to 0.70. Mean particle volume ratio can be determined by the following procedure:

1. Mean particle weight is calculated by weighing a random sample of abrasive grains, counting the number of grains in the sample, preferably by means of an electronic particle analyzer, and dividing the weight by the number of particles to obtain an average weight per particle.

2. The density of the sample is measured by means of a gas pycnometer.

3. The mean particle weight is then divided by the density to obtain mean particle volume.

4. The mean particle volume can be compared with the volume determined for standard sands of the same grade. Relative volume can be determined by dividing the volume of the sample grain by the volume of the standard sand.

The following table indicates the weight/particle and volume/particle for standard sands. (ANSI Standard #B74.18, 1984).

| Grade | Weight/particle (g × $10^{-6}$) | Volume/particle (cc × $10^{-6}$) |
|---|---|---|
| 20 | 1524 | 397 |
| 24 | 918 | 239 |
| 30 | 610 | 159 |
| 36 | 342 | 89 |
| 40 | 209 | 54 |
| 50 | 90 | 23 |
| 60 | 42 | 10.9 |
| 80 | 11.2 | 2.9 |
| 100 | 4.9 | 1.3 |
| 120 | 2.4 | 0.63 |
| 150 | 1.6 | 0.42 |

Average thickness of the abrasive grains of this invention cannot exceed 460 micrometers. As used herein, the term "average thickness" means approximating an arithmetic mean thickness, i.e. midway between extremes of thickness. If the average thickness were to exceed 460 micrometers, the result would be fewer grains for a given loading weight, and fewer cutting edges for a given loading weight.

Aspect ratio, i.e. the ratio of length to width, is not critical, and it typically varies from about 1.6 to about 2.0. According to conventional thinking, the mineral with the highest aspect ratio, i.e. the sharpest mineral, should cut the most material during grinding. Surprisingly, however, it was found that aspect ratio did not significantly affect cutting performance.

Other properties, e.g. hardness, strength, density, do not differ significantly from those properties of conventional abrasive grains having a random shape.

The grains can be used in a wide variety of abrasive products, such as, for example, coated abrasive belts, abrasive discs, bonded wheels, brushes, and nonwoven abrasive products. Abrasive products made with the abrasive grains of the present invention exhibit higher initial cut and higher total cut than do abrasive products having equivalent weight loadings of conventional abrasive grains. In addition, abrasive products made with the grains of the present invention require lower grinding forces than do abrasive products made with an equivalent amount by weight of conventional abrasive grains. It should be noted, however, that the benefits provided by the abrasive grains described herein are only available when these grains are positioned so that they are substantially normal with respect to the surface that is to be abraded, i.e. the surface of the workpiece.

In order to obtain the advantages provided by the abrasive grains of the present invention, at least about 15% by weight, and preferably 50 to 100% by weight, of the abrasive grains of the abrasive product should be the shaped abrasive grains of this invention.

The preparation of alumina-based ceramic materials by means of a chemical ceramic process usually begins with the preparation of a dispersion comprising from about 2 to almost 60 weight percent alpha aluminum oxide monohydrate (boehmite). The boehmite can either be prepared from various techniques well known in the art or can be acquired commercially from a number of suppliers. Examples of commercially available materials include Disperal ®, produced by Condea Chemie, GMBH and Catapal ® SB, produced by Vista Chemical Company. These aluminum oxide monohydrates are in the alpha-form, are relatively pure (including relatively little, if any, hydrate phases other than monohydrates), and have a high surface area.

The dispersion may contain a precursor of a modifying additive which can be added to enhance some desirable property of the finished product or increase the effectiveness of the sintering step. These additives are in the form of soluble salts, typically water soluble, and typically consist of a metal-containing compound and can be a precursor of the oxides of magnesium, zinc, cobalt, nickel, zironium, hafnium, chromium, titanium, yttrium, rare earth oxides, and mixtures thereof. The exact proportions of these components that are present in the dispersion are not critical to this invention and thus can vary to convenience.

A peptizing agent is usually added to the boehmite dispersion to produce a more stable hydrosol or colloidal dispersion. Monoprotic acids or acid compounds which may be used as the peptizing agent include acetic, hydrochloric, formic and nitric acid. Nitric acid is a preferred peptizing agent. Multiprotic acids are normally avoided since they rapidly gel the dispersion making it difficult to handle or mix in additional components. Some commercial sources of boehmite contain an acid titer (such as absorbed formic or nitric acid) to assist in forming a stable dispersion.

The dispersion can be formed by any suitable means which may simply be the mixing of aluminum oxide monohydrate with water containing a peptizing agent or by forming an aluminum oxide monohydrate slurry to which the peptizing acid is added. Once the dispersion is formed, it preferably is then gelled. The gel can be formed by any conventional technique such as the addition of a dissolved or dispersed metal containing modifying additive, e.g. magnesium nitrate, the removal of water from the dispersion or some combination of such techniques.

Once the gel has formed it may be shaped by any convenient method such as pressing, molding, coating, or extrusion and then carefully dried to produce an uncracked body of the desired shape.

The gel can be extruded or simply spread out to any convenient shape and dried, typically at a temperature below the frothing temperature of the gel. Any of several dewatering methods, including solvent extraction, can be used to remove the free water of the gel to form a solid.

After the solid is dried, the dried solid can be crushed or broken by any suitable means, such as a hammer or ball mill, to form particles or grains. Any method for comminuting the solid can be used and the term "crushing" is used to include all such methods.

After crushing or breaking the dried gel can then be calcined to remove essentially all volatiles and transform the various components of the grains into ceramics (metal oxides). The dried gel is generally heated to a temperature between about 400° C. and about 800° C. and held within this temperature range until the free water and over 90 weight percent of any bound water is removed.

The calcined material is then fired by heating to a temperature of between about 1200° C. and about 1650° C. and holding within this temperature range until substantially all of the alpha alumina monohydrate is converted to alpha alumina. Of course, the length of time to which the ceramic must be exposed to the firing temperature to achieve this level of conversion will depend upon various factors but usually from about 5 to about 30 minutes is sufficient.

Other steps can be included in this process, such as rapidly heating the material from the calcining temperature to the firing temperature, sizing granular material, centrifuging the dispersion to remove sludge waste, etc. Moreover, this process can be modified by combining two or more of the individually described steps, if desired.

These conventional process steps and materials are more fully described in U.S. Pat. No. 4,574,003, incorporated herein by reference.

The abrasive grains of this invention can also be prepared by means of fusion technology and sintering technology.

The following non-limiting examples further illustrate the advantages of the present invention. All parts and percentages are by weight unless otherwise indicated.

EXAMPLE 1

An aqueous dispersion of boehmite alumina sol (27.5% solids) and an aqueous solution of magnesium nitrate (65% solids) were combined in the ratio of 6 parts sol to 1 part magnesium nitrate. The mixture was extruded through a sheet die of a conventional coat hanger design to a film thickness of 1590 micrometers. The resulting film was carried into a drier, dried at 230° C. for 5 to 10 minutes, and collected as a dried platelet-like material. The dried platelets were crushed by means of a roll crusher and sized to a $-1350$ micrometer diameter to a $+335$ micrometer diameter particle size distribution. The crushed platelets were calcined at 600° C. for approximately 5 to 10 minutes and fired to substantially full density at 1400° C. for less than 5 minutes. The abrasive grain produced was graded to a grit size of 24. Mean particle volume was determined in the manner previously described. The platelets had a mean particle volume of $158 \times 10^{-6}$ cc per particle, and a mean particle volume ratio of 0.66.

Figure 4:
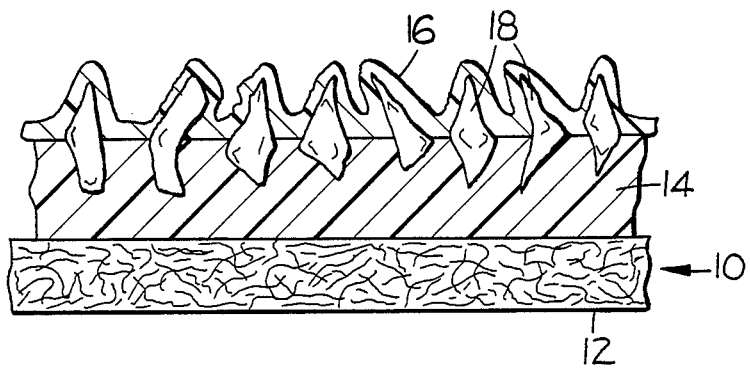
FIG. 4 is a sectional view of a coated abrasive article that can utilize the abrasive grains of FIG. 1.

Coated abrasive discs 10 of the type shown in FIG. 4 were prepared as follows:

A conventional 0.76 mm vulcanized fiber backing 12 was provided. Both make and size coats 14, 16 respectively, were conventional calcium carbonate filled phenolic resin. Make coat 14 was applied by means of a roll coater and the shaped abrasive grains 18 were applied by means of an electrostatic coater. The electrostatic coater tends to deploy shaped abrasive grains 18 in such a way that they are in a substantially normal position with respect to the backing, thereby allowing the grains to be oriented substantially normal to the workpiece during abrading operations. Make coat 14 was precured for 75 minutes at 88° C. Size coat 16 was applied by means of a roll coater and precured for 90 minutes at 88° C., and final cured for 24 hours at 100° C. The cured product was converted to 17.8 cm × 2.2 cm discs. The coating weights of make coat 14, size coat 16, and mineral coat 18 were as follows:

| Coating | Coating weight (g/cm$^2$) |
| --- | --- |
| Make | 0.039 |
| Mineral | 0.125 |
| Size | 0.057 |

The cured discs were first conventionally flexed to controllably crack the hard bonding resins, then mounted on a beveled aluminum back-up pad, and finally used to grind the face of a 2.54 cm × 18 cm 1018 cold rolled steel workpiece. The disc was driven at 5000 rpm while the portion of the disc overlying the beveled edge of the back-up pad contacted the workpiece at a pressure of 0.2 kg/cm$^2$, generating disc wear path of about 140 cm$^2$. Each disc was used to grind four separate workpieces for a duration of 1 minute each in rotation to an accumulated endpoint of 20 minutes. The control was a Regal ® Resin Bond Fibre disc available from Minnesota Mining and Manufacturing Company. The control employed aluminum oxide grains having a grit size of 24. The results of the test were as follows:

| Disc | Initial cut (g) | Total cut (g) |
| --- | --- | --- |
| Control | 48 | 683 |
| Example 1 | 61 | 837 |

The coated abrasive of this invention showed 27% improvement in initial cut and 30% improvement in total cut over the control.

EXAMPLE 2

Abrasive platelets were formed in the same manner as were the platelets in Example 1. The abrasive grain produced was graded to a grit size of 36. The mean particle volume was $62 \times 10^{-6}$ cc/particle and the mean particle volume ratio was 0.70. The mean particle volume for grade 36 Cubitron ® mineral, available from Minnesota Mining and Manufacturing Company, was $93 \times 10^{-6}$ cc/particle, and the mean particle volume ratio was 1.04. The coated abrasive belts used a filled polyester y weight sateens cloth as the backing. The make coat was a conventional solution of phenol-formaldehyde resin and calcium carbonate filler. The size coat was a conventional solution containing phenol-formaldehyde resin and calcium carbonate filler. The make coat was applied to the backing by means of a roll coater. Abrasive grains were applied by means of electrostatic coating. The make coat precured for 75 minutes at 88° C. The size coat was applied by means of a roll coater. The size coat was precured for 90 minutes at 88° C. The size coat was final cured for 10 hours at 100° C. The coated abrasive sheets were converted to 7.6 cm×335 cm endless belts. The coating weights of the make coat, size coat, and mineral coat were as follows:

| Coating | Coating weight (g/cm$^2$) |
| --- | --- |
| Make | 0.029 |
| Mineral | 0.091 |
| Size | 0.047 |

The coated abrasive belts were tested on a reciprocating bed grinder. The belts were run at 40 m/sec over a 40 cm diameter steel contact wheel. The coated abrasive belts were tested on 1095 steel with a depth of cut of 0.5 mm and a through feed rate of 10 cm/sec. The grinding forces, cut rate, and surface temperature were compared to those values obtained with grade 36 Regal ® Resin Bond cloth belts available from Minnesota Mining and Manufacturing Company. The results of the tests were as follows:

| Belt material | Cut (cm$^3$)/ path (cm$^2$) | Tangential force (kg/cm width) | Normal force (kg/cm width) | Surface temp (°C.) |
| --- | --- | --- | --- | --- |
| Control | 0.349 | 11.6 | 81.4 | 188 |
| Example 2 | 0.518 | 8.6 | 50.1 | 127 |

The belt of Example 2 showed 48% improvement in cut rate over the control while reducing the tangential grinding force by more than 25% and reducing the normal grinding force by 38%. The reduction in grinding force indicates a more efficient coated abrasive product. As a result of the reduced grinding forces, the surface temperature of the workpiece decreased by 50° C.

EXAMPLE 3

A sample of grade 24 platelets similar to those prepared in Example 1 were analyzed to determine the effect of shape on cutting performance.

A Jeffries Table was used to separate mineral into various fractions, from blocky shaped mineral particles to sharp, platelet-like particles. Conventional abrasive grain (grade 24) contained 47% blocky mineral and 22% sharp, platelet-like particles. The grade 24 platelets contained 0.8% blocky mineral and 97.5% sharp, platelet-like particles.

Mean particle volumes and aspect ratios were measured for each sample and were as follows:

| Mineral | Mean particle volume | Relative particle volume | Aspect ratio |
| --- | --- | --- | --- |
| Blocky Cubitron ® | $243 \times 10^{-6}$ | 1.02 | 1.31 |
| Conventional Cubitron ® | $214 \times 10^{-6}$ | 0.90 | 1.50 |
| Sharp Cubitron ® | $192 \times 10^{-6}$ | 0.80 | 1.69 |
| Platelets of invention | $158 \times 10^{-6}$ | 0.66 | 1.62 |

Fiber discs were prepared from the four abrasive grain samples by means of the same procedures employed in Example 1 for coated abrasive fiber discs.

The discs were tested with a slide action disc tester on 1018 steel, as in Example 1. The results are shown below:

| Abrasive material | Total cut (g) |
| --- | --- |
| Blocky Cubitron ® | 506 |
| Conventional Cubitron ® | 601 |
| Sharp Cubitron ® | 705 |
| Platelets of invention | 828 |

Discs using platelets of this invention showed a 31% improvement over discs using conventional Cubitron, a 57% improvement over discs using blocky Cubitron, and a 13% improvement over discs using sharp Cubitron.

EXAMPLE 4

This example demonstrates the superiority of the abrasive grains of this invention in abrasive articles other than coated abrasive articles.

Mean particle volume for grade 36 aluminum oxide was $86 \times 10^{-6}$ cc/particle, and mean particle volume ratio was 0.97. Mean particle volume for grade 36 platelets was $62 \times 10^{-6}$ cc/particle, and mean particle volume ratio was 0.70.

An open-mesh substrate of polyvinyl chloride was coated with a 50/50 blend of epoxy resin ("Epon" 828) and polyamide ("Versamid" 125). Mineral was then drop coated on the resin substrate so as to allow the mineral to lie flat on the substrate. The resin was cured, and the substrate converted into wheels by wrapping the substrate around a 7.6 cm diameter core helically to expose the sharp edges of the mineral.

The wheels were tested on a robot tester consisting of a grinder which held the 7.6 cm diameter×2.5 cm wide wheels. The wheels were run at 1190 rpm against a 5.0 cm wide by 0.63 cm thick 1018 steel workpiece. A dead load of 0.9 kg/cm width was applied to the workpiece against the wheel. The test period consisted of two five minute passes per wheel. The control was a wheel containing conventional brown aluminum oxide.

The test results were as follows:

| Material | First cut (g) | Second cut (g) | Total cut (g) |
| --- | --- | --- | --- |
| Conventional brown aluminum oxide | 5.6 | 3.2 | 8.8 |
| Platelets of invention | 7.0 | 6.2 | 13.2 |

Non-woven abrasive product using platelets of this invention showed a 50% improvement over non-woven abrasive product using conventional brown aluminum oxide.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. An abrasive article of a type which has at least one abrading surface and includes abrasive grains, at least a portion of said abrasive grains comprising shaped abrasive grains having a shape such that the average thickness of said grains is no greater than about 460 micrometers, said shaped abrasive grains having a mean particle volume ratio of less than about 0.8.

2. An article according to claim 1 wherein said shaped abrasive grains have a mean particle volume ratio from about 0.3 to about 0.7.

3. An article according to claim 1 wherein said shaped abrasive grains comprises at least about 15% by weight of the abrasive grains of said article.

4. An article according to claim 1 wherein the thickness of said shaped abrasive grains is substantially uniform throughout each grain.

5. An article according to claim 1 wherein said abrasive grains are deployed in said article in a substantially normal position with respect to said abrading surface.

6. An article according to claim 1 wherein said shaped abrasive grains comprise non-fused aluminum oxide-based abrasive mineral.

7. An article according to claim 1 wherein said article is a coated abrasive product.

8. An article according to claim 1 wherein said article is a bonded abrasive product.

9. An article according to claim 1 wherein said article is a nonwoven abrasive article.

10. An article according to claim 1 wherein said article is an abrasive brush.

* * * * *

UNITED STATES PATENT AND TRADEMARK OFFICE
CERTIFICATE OF CORRECTION

PATENT NO. : 4,848,041

DATED : JULY 18, 1989

INVENTOR(S) : HOWARD L. KRUSCHKE

It is certified that error appears in the above-identified patent and that said Letters Patent is hereby corrected as shown below:

Col. 7, line 25, "y" should be --Y--.

Signed and Sealed this

Seventh Day of May, 1991

Attest:

HARRY F. MANBECK, JR.

Attesting Officer

Commissioner of Patents and Trademarks